June 17, 1924.                                      1,498,409
                        J. A. WALSH
                   PNEUMATIC STRAW STACKER
                   Filed April 21, 1921
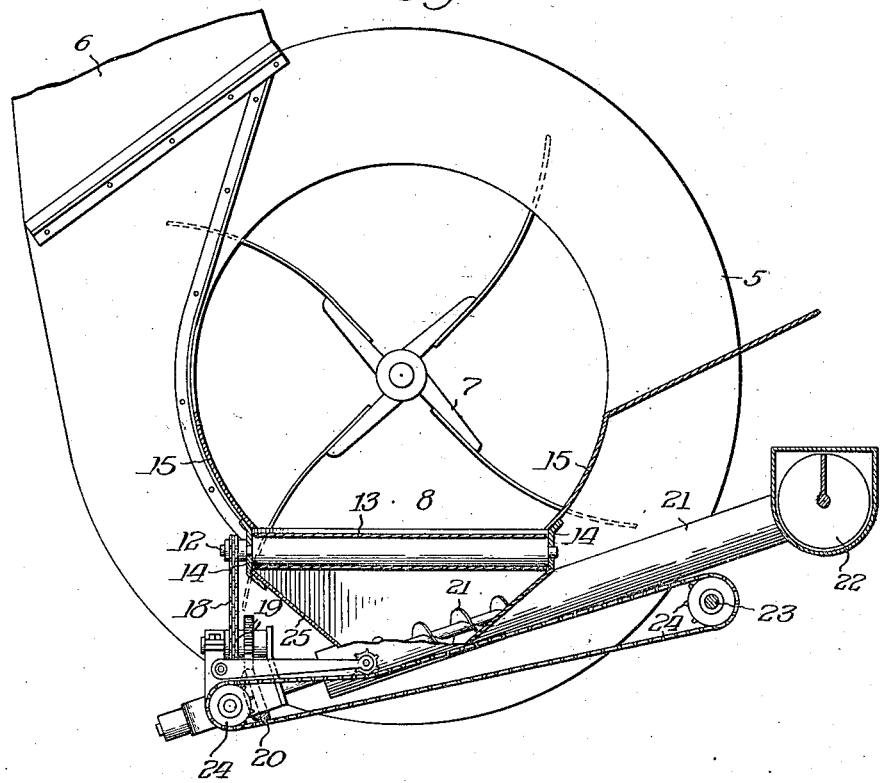
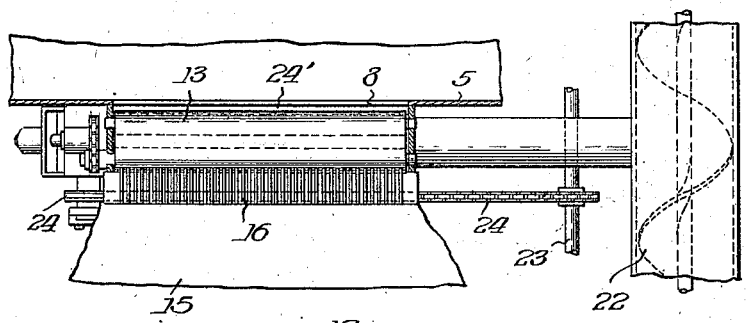
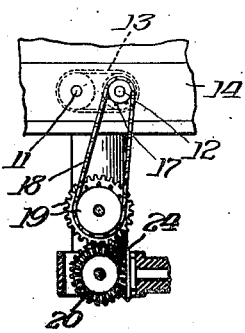
Witness:                                         Inventor
                                                 James A. Walsh

Patented June 17, 1924.

1,498,409

UNITED STATES PATENT OFFICE.

JAMES A. WALSH, OF INDIANAPOLIS, INDIANA, ASSIGNOR TO THE INDIANA MANUFACTURING COMPANY, OF INDIANAPOLIS, INDIANA, A CORPORATION OF WEST VIRGINIA.

PNEUMATIC STRAW STACKER.

Application filed April 21, 1921. Serial No. 463,279.

*To all whom it may concern:*

Be it known that I, JAMES A. WALSH, a citizen of the United States, residing at Indianapolis, in the county of Marion and State of Indiana, have invented certain new and useful Improvements in Pneumatic Straw Stackers, of which the following is a specification.

My invention relates to that type of wind stacker wherein means are provided for separating and trapping grain discharged thereinto with straw, chaff, dust, etc., from a threshing machine, whereby such grain is saved from wastage in the straw stack and may be returned to the threshing machine to be recleaned, or otherwise disposed of; and my object is to provide a simple and inexpensive device for the purpose which is durable and readily operable and which will be hereinafter more fully pointed out.

In the accompanying drawing, forming part hereof, Figure 1 is an elevation of a wind stacker fan to which my improvement is applied; Fig. 2, a fragmentary plan, and Fig. 3 is a detail indicating my improvement and the driving mechanism for actuating the same.

In said drawings, the portions marked, 5, indicate the stacker fan-casing, having the usual outlet, 6, and fan, 7, said casing having an inlet opening, 8, as is common. Adjacent the inlet of the fan-casing 5 I position a conveyer comprising rolls, 11, 12, and an endless belt or equivalent carrier, 13, mounted thereon and adapted to be actuated toward said fan inlet 8, said rolls being mounted in appropriate bearing supports, as the brackets, 14, Fig. 1. Said conveyer, as will be understood, is interposed between the hopper, 15, of the stacker and said inlet 8, and between said conveyer and hopper I prefer to include a grooved separating plate or comb, 16, upon which material is discharged from hopper 15 and moves upon said carried 13 by which it is conveyed toward the fan inlet 8.

Said rolls, 11, 12, may be driven in any suitable manner to actuate carrier 13, and in Fig. 3 is indicated a preferred form for the purpose, comprising a sprocket, 17, driven by a chain, 18, communicating with a combined sprocket and gear, 19, which latter meshes with a gear, 20, forming part of the return auger, 21, and is operated thereby. The return auger 21 is of the common and well known arrangement, which leads to the tailings auger, 22, of the threshing machine, and which may be driven from a countershaft, 23, by a sprocket-and-chain system, 24, as is usual.

In operation, straw, chaff, dust, etc., with which more or less loose and unthreshed grain heads are mingled, discharge from the threshing machine into the wind stacker hopper 15 in a well known manner, and, by gravity and the influence of the suction created by the fan 7, is withdrawn into fan-casing 5 and discharged through outlet 6 to a straw stack, or otherwise. However, with my improved grain saving device the loose grain and unthreshed heads, being heavier than the straw, etc., sift through to the bottom of the material and are dragged therewith across the plate or comb 16 from whence such material passes to the carrier 13, which latter moves such grain and material toward the fan inlet 8. As the suction created by fan 7 extends out into the stacker hopper across said carrier 13 and comb 16, it lifts and pulls the straw and light material into the fan-casing 5 to be discharged through its outlet, while the grain is moved to the space, 24′, between fan-casing 5 and carrier 13 through which it falls, preferably into a hopper 25, and thence into the auger 21 to be returned to the tailings auger 22 of the threshing machine and saved, or may be otherwise disposed of.

In this manner I provide a simple and positive device for accelerating the movement of the straw and light material into the fan inlet and at the same time separating the grain which sifts therethrough, and convey such grain from the influence of the stacker fan and save the same. It will be understood that my improved carrier separating device is arranged immediately adjacent the lower end of the fan inlet and approximately in the plane of said lower end and the end of hopper 15, between which it is interposed, and is of a comparatively simple and inexpensive construction, as it may be composed of canvas or other suitable material which may be provided with transverse grooves, slats or other devices, if desirable, for operating upon the material which it actuates.

I claim as my invention:

1. A pneumatic stacker for a thrashing machine comprising a fan embodying an inlet, a hopper communicating with said fan for receiving and conveying material thereinto and having an opening adjacent said fan, a support in said hopper opening and secured to said fan-casing, an endless carrier mounted in said support for separating grain from other material, means for actuating said carrier toward said fan for conveying material thereto, and means beneath said carrier for receiving grain therefrom and conveying the same to said thrashing machine.

2. A pneumatic stacker for a thrashing machine comprising a fan embodying an inlet, a hopper for receiving and conveying material into said fan and having an opening therein, a grain separating and saving device interposed in said opening between said hopper and fan comprising an endless carrier positioned in substantially the same plane with the lower side of said inlet and the end of said hopper, means for actuating said carrier toward said inlet, and means beneath said carrier for receiving grain therefrom and conveying the same to said thrashing machine.

3. A pneumatic stacker for a thrashing machine comprising a fan embodying an inlet, a hopper communicating with said fan for receiving material and conveying the same into said fan and having an opening adjacent said fan, an endless carrier mounted in said opening for separating the grain from other material and saving the same, separating means interposed between said hopper and said carrier over which material passes from said hopper to said carrier, means beneath said carrier for receiving grain therefrom and conveying the same to said thrashing machine, and driving means connected to said carrier and said grain receiving and conveying means for actuating said elements.

In testimony whereof I affix my signature.

JAMES A. WALSH.